United States Patent
Zhang et al.

(10) Patent No.: US 9,444,583 B2
(45) Date of Patent: Sep. 13, 2016

(54) TRANSMITTED PRECODING INDICATOR COMBINING METHOD, TERMINAL AND NETWORK-SIDE DEVICE

(71) Applicant: Huawei Technologies Co., Ltd., Shenzhen, Guangdong (CN)

(72) Inventors: Peng Zhang, Shanghai (CN); Zongjie Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 14/570,918

(22) Filed: Dec. 15, 2014

(65) Prior Publication Data

US 2015/0117379 A1 Apr. 30, 2015

Related U.S. Application Data

(63) Continuation of application No. PCT/CN2012/079098, filed on Jul. 24, 2012.

(30) Foreign Application Priority Data

Jun. 28, 2012 (WO) ................ PCT/CN2012/077730

(51) Int. Cl.
*H04L 12/43* (2006.01)
*H04L 1/06* (2006.01)
(Continued)

(52) U.S. Cl.
CPC ............... *H04L 1/06* (2013.01); *H04W 72/00* (2013.01); *H04B 7/024* (2013.01); *H04B 7/0456* (2013.01); *H04B 7/0639* (2013.01)

(58) Field of Classification Search
CPC ............................. H04L 1/06; H04B 7/0639

USPC ................. 370/348, 443, 458, 500
See application file for complete search history.

(56) References Cited

U.S. PATENT DOCUMENTS

| | | | |
|---|---|---|---|
| 2008/0043867 A1 | 2/2008 | Blanz et al. | |
| 2014/0010327 A1 | 1/2014 | Chen et al. | |

FOREIGN PATENT DOCUMENTS

| | | |
|---|---|---|
| CN | 101507139 A | 8/2009 |
| CN | 101964675 A | 2/2011 |

(Continued)

OTHER PUBLICATIONS

3GPP, Technical Specification Group Radio Access Network, Physicaly Layer Procedures (FDD) (Release 11), 3GPP TS 25.214 V11.1.0, Mar. 31, 2012.*

(Continued)

*Primary Examiner* — Ricky Ngo
*Assistant Examiner* — Wei-Po Kao
(74) *Attorney, Agent, or Firm* — Leydig, Voit & Mayer, Ltd.

(57) ABSTRACT

Embodiments of the present invention relate to a precoding indicator combining method, a terminal and a network-side device. The method includes: receiving, by a terminal and from a network-side device, an offset position of a downlink fractional dedicated physical channel F-DPCH or a downlink dedicated physical channel DPCH of at least one cell, and an offset position of a downlink fractional transmitted precoding indicator channel F-TPICH of at least one cell; and determining, by the terminal, a transmitted precoding indicator TPI combining window of the cell, so that an effective position of a TPI is located at a timeslot boundary of the first uplink dedicated physical control channel DPCCH after an end boundary of the TPI combining window, thereby enabling a UE to use a timely TPI and improving demodulation performance of the UE for sending data.

5 Claims, 8 Drawing Sheets

(51) Int. Cl.
*H04W 72/00* (2009.01)
*H04B 7/06* (2006.01)
*H04B 7/02* (2006.01)
*H04B 7/04* (2006.01)

(56) References Cited

FOREIGN PATENT DOCUMENTS

| CN | 102098143 A | 6/2011 |
|---|---|---|
| CN | 102340371 A | 2/2012 |
| CN | 102340380 A | 2/2012 |
| WO | WO 2010107699 A2 | 9/2010 |
| WO | WO 2010107699 A3 | 9/2010 |

OTHER PUBLICATIONS

"3$^{rd}$ Generation Partnership Project; Technical Specification Group Radio Access Network; Physical Layer Procedures (FDD)(Release 11)," 3GPP TS 25.214, V11.2.0, pp. 1-108, 3$^{rd}$ Generation Partnership Program, Valbonne, France (Jun. 2012).

"3$^{rd}$ Generation Partnership Project; Technical Specification Group Radio Access Network; Physical Layer Procedures (FDD)(Release 11)," 3GPP TS 25.214, V11.1.0, pp. 1-106, 3$^{rd}$ Generation Partnership Program, Valbonne, France (Mar. 2012).

"3$^{rd}$ Generation Partnership Project; Technical Specification Group Radio Access Network; Physical Channels and Mapping of Transport Channels on Physical Channels (FDD)(Release 11)," 3GPP TS 25.211, V11.0.0, pp. 1-60, 3$^{rd}$ Generation Partnership Program, Valbonne, France (Dec. 2011).

* cited by examiner

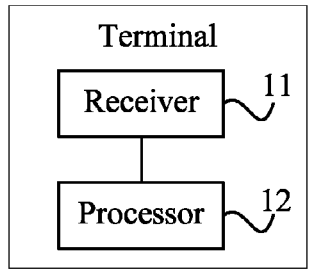

FIG. 7

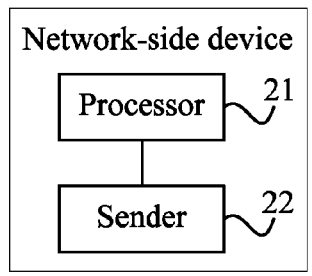

FIG. 8

A terminal receives from a network-side device, an offset position of a downlink F-DPCH or a downlink DPCH of at least one cell and an offset position of a downlink F-TPICH of the at least one cell, where the offset position of the downlink F-DPCH or the offset position of the downlink DPCH is a hysteresis time from a start position of the downlink F-DPCH or a start position of the downlink DPCH to a frame start position of a former downlink primary common control physical channel P-CCPCH in a time length of two P-CCPCH frames, and the offset position of the downlink F-TPICH is a hysteresis time from a start position of the downlink F-TPICH to the frame start position of the former downlink P-CCPCH in a time length of two P-CCPCH frames ⸺ S901

The terminal determines, according to the offset position of the downlink F-DPCH or the downlink DPCH and the offset position of the downlink F-TPICH of each cell, a precoding indicator TPI combining window of each cell ⸺ S902

FIG. 9

A network-side device determines an offset position of a downlink F-DPCH or a downlink DPCH of at least one cell and an offset position of a downlink F-TPICH of the at least one cell, where the offset position of the downlink F-DPCH or the offset position of the downlink DPCH is a hysteresis time from a start position of the downlink F-DPCH or a start position of the downlink DPCH to a frame start position of a former downlink P-CCPCH in a time length of two primary common control physical channel P-CCPCH frames, and the offset position of the downlink F-TPICH is a hysteresis time from a start position of the downlink F-TPICH to the frame start position of the former downlink P-CCPCH in a time length of two P-CCPCH frames ⸺ S1001

The network-side device delivers the offset position of the downlink F-DPCH or the downlink DPCH of the at least one cell to a terminal, and delivers the offset position of the downlink F-TPICH of the at least one cell ⸺ S1002

FIG. 10

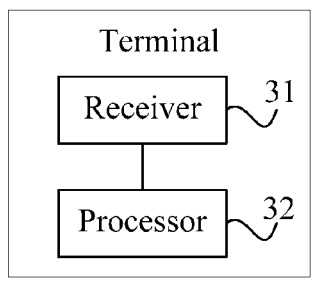

FIG. 11

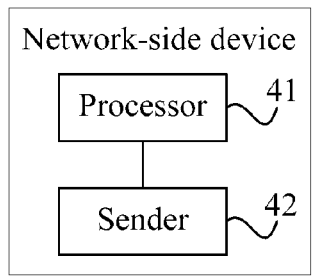

FIG. 12

TRANSMITTED PRECODING INDICATOR COMBINING METHOD, TERMINAL AND NETWORK-SIDE DEVICE

CROSS-REFERENCE TO RELATED APPLICATIONS

This application is a continuation of International Patent Application No. PCT/CN2012/079098, filed on Jul. 24, 2012, which claims priority to International Application No. PCT/CN2012/077730, filed on Jun. 28, 2012, both of which are hereby incorporated by reference in their entireties.

TECHNICAL FIELD

Embodiments of the present invention relate to the field of communications technologies, and in particular, to a precoding indicator combining method, a terminal and a network-side device.

BACKGROUND

A process of sending data by a multi-antenna closed loop transmit diversity (Closed Loop Transmit Diversity, CLTD) is that: a user equipment (User Equipment, UE) sends pilot information to a serving cell, and after detecting a channel state through the pilot, the cell determines a transmitted precoding indicator (Transmitted Precoding Indicator, TPI), and sends the TPI to the UE by bearing the TPI on a fractional transmitted precoding indicator channel (Fractional Transmitted Precoding Indicator Channel, F-TPICH). The UE detects the F-TPICH, performs parsing to obtain the TPI, and selects a precoding code book according to the TPI to send uplink data. The UE can receive the F-TPICHs of multiple cells in a serving radio link set (Radio Link Set, RLS). The TPIs on these F-TPICHs are of the same information, so the UE can combine TPIs in TPI combining windows corresponding to these cells.

In the prior art, a UE applies precoding information indicated by a TPI on a timeslot boundary of the first uplink dedicated physical control channel (Dedicated Physical Control Channel, DPCCH) after 512 chips after receiving the second TPI symbol in TPI information. However, a timing relationship between a DPCCH and an F-TPICH channel is uncertain, which causes that an effective position of the TPI is uncertain when the UE performs a TPI combining operation. Therefore, the TPI used by the UE may be not a most timely TPI, thereby causing poor demodulation performance of the UE for sending data.

SUMMARY

Embodiments of the present invention provide a transmitted precoding indicator combining method, a terminal and a network-side device, to enable a UE to use a timely TPI and improve demodulation performance of the UE for sending data.

In one aspect, an embodiment of the present invention provides a transmitted precoding indicator combining method, where the method includes:

receiving, by a terminal and from a network-side device, an offset position of a downlink fractional dedicated physical channel F-DPCH or an offset position of a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a start position of a downlink P-CCPCH in a time length of two primary common control physical channel P-CCPCH frames, and the offset position of the downlink F-TPICH is a hysteresis time from a start position of the downlink F-TPICH to the start position of the downlink P-CCPCH in a time length of two P-CCPCH frames; and determining, by the terminal according to the offset position of the downlink F-DPCH or the offset position of the downlink DPCH and the offset position of the downlink F-TPICH of each cell, a transmitted precoding indicator TPI combining window of the cell, so that an effective position of a TPI is located at a timeslot boundary of the first uplink dedicated physical control channel DPCCH after an end boundary of the TPI combining window.

An embodiment of the present invention further provides a terminal, where the terminal includes:

a receiver, configured to receive from a network-side device, an offset position of a downlink fractional dedicated physical channel F-DPCH or an offset position of a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a start position of a downlink primary common control physical channel P-CCPCH in a time length of two P-CCPCH frames, and the offset position of the downlink F-TPICH is a hysteresis time from a start position of the downlink F-TPICH to the start position of the downlink P-CCPCH in a time length of two P-CCPCH frames; and a processor, configured to determine, according to the offset position of the downlink F-DPCH or the offset position of the downlink DPCH and the offset position of the downlink F-TPICH of each cell, a transmitted precoding indicator TPI combining window of the cell, so that an effective position of a TPI is located at a timeslot boundary of a first uplink dedicated physical control channel DPCCH after an end boundary of the TPI combining window.

In another aspect, an embodiment of the present invention further provides a transmitted precoding indicator combining method, where the method includes:

determining, by a network-side device, an offset position of a downlink fractional dedicated physical channel F-DPCH or an offset position of a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a start position of a downlink primary common control physical channel P-CCPCH in a time length of two P-CCPCH frames, and the offset position of the downlink F-TPICH is a hysteresis time from a start position of the downlink F-TPICH to the start position of the downlink P-CCPCH in a time length of two P-CCPCH frames; and delivering, by the network-side device, the offset position of the downlink F-DPCH or the offset position of the downlink DPCH of the at least one cell to a terminal, and delivering the offset position of the downlink F-TPICH of the at least one cell, so that the terminal determines a transmitted precoding indicator TPI combining window of each cell according to the offset position of the downlink F-DPCH or the offset position of the downlink DPCH and the offset position of the downlink F-TPICH.

An embodiment of the present invention further provides a network-side device, where the network-side device includes:

a processor, configured to determine an offset position of a downlink fractional dedicated physical channel F-DPCH or an offset position of a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a start position of a downlink primary common control physical channel P-CCPCH in a time length of two P-CCPCH frames, and the offset position of the downlink F-TPICH is a hysteresis time from a start position of the downlink F-TPICH to the start position of the downlink P-CCPCH in a time length of two P-CCPCH frames; and a sender, configured to deliver the offset position of the downlink F-DPCH or the offset position of the downlink DPCH of the at least one cell to a terminal, and deliver the offset position of the downlink F-TPICH of the at least one cell, so that the terminal determines a transmitted precoding indicator TPI combining window of each cell according to the offset position of the downlink F-DPCH or the offset position of the downlink DPCH and the offset position of the downlink F-TPICH.

In another aspect, an embodiment of the present invention provides a transmitted precoding indicator combining method, where the method includes:

receiving, by a terminal and from a network-side device, an offset position of a downlink fractional dedicated physical channel F-DPCH or an offset position of a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a frame start position of a former downlink P-CCPCH in a time length of two primary common control physical channel P-CCPCH frames, and the offset position of the downlink F-TPICH is a hysteresis time from a start position of the downlink F-TPICH to the frame start position of the former downlink P-CCPCH in a time length of two P-CCPCH frames; and determining, by the terminal according to the offset position of the downlink F-DPCH or the offset position of the downlink DPCH and the offset position of the downlink F-TPICH of each cell, a transmitted precoding indicator TPI combining window of the cell, so that an effective position of a TPI is located at a timeslot boundary of the first uplink dedicated physical control channel DPCCH after an end boundary of the TPI combining window.

An embodiment of the present invention further provides a transmitted precoding indicator combining method, where the method includes:

determining, by a network-side device, an offset position of a downlink fractional dedicated physical channel F-DPCH or an offset position of a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a frame start position of a former downlink primary common control physical channel P-CCPCH in a time length of two P-CCPCH frames, and the offset position of the downlink F-TPICH is a hysteresis time from a start position of the downlink F-TPICH to the frame start position of the former downlink P-CCPCH in a time length of two P-CCPCH frames; and delivering, by the network-side device, the offset position of the downlink F-DPCH or the offset position of the downlink DPCH of the at least one cell to a terminal, and delivering the offset position of the downlink F-TPICH of the at least one cell, so that the terminal determines a transmitted precoding indicator TPI combining window of each cell according to the offset position of the downlink F-DPCH or the offset position of the downlink DPCH and the offset position of the downlink F-TPICH.

In another aspect, an embodiment of the present invention further provides a terminal, where the terminal includes:

a receiver, configured to receive from a network-side device, an offset position of a downlink fractional dedicated physical channel F-DPCH or an offset position of a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a frame start position of a former downlink primary common control physical channel P-CCPCH in a time length of two P-CCPCH frames, and the offset position of the downlink F-TPICH is a hysteresis time from a start position of the downlink F-TPICH to the frame start position of the former downlink P-CCPCH in a time length of two P-CCPCH frames; and a processor, configured to determine, according to the offset position of the downlink F-DPCH or the offset position of the downlink DPCH and the offset position of the downlink F-TPICH of each cell, a transmitted precoding indicator TPI combining window of the cell, so that an effective position of a TPI is located at a timeslot boundary of a first uplink dedicated physical control channel DPCCH after an end boundary of the TPI combining window.

An embodiment of the present invention further provides a network-side device, where the network-side device includes:

a processor, configured to determine an offset position of a downlink fractional dedicated physical channel F-DPCH or an offset position of a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a frame start position of a former downlink primary common control physical channel P-CCPCH in a time length of two P-CCPCH frames, and the offset position of the downlink F-TPICH is a hysteresis time from a start position of the downlink F-TPICH to the frame start position of the former downlink P-CCPCH in a time length of two P-CCPCH frames; and a sender, configured to deliver the offset position of the downlink F-DPCH or the offset position of the downlink DPCH of the at least one cell to a terminal, and deliver the offset position of the downlink F-TPICH of the at least one cell, so that the terminal determines a transmitted precoding indicator TPI combining window of each cell according to the offset position of the downlink F-DPCH or the offset position of the downlink DPCH and the offset position of the downlink F-TPICH.

In the transmitted precoding indicator combining method, the terminal and the network-side device provided in the embodiments of the present invention, the terminal determines a transmitted precoding indicator TPI combining window according to an offset position of a downlink F-DPCH or an offset position of a downlink DPCH and an offset position of a downlink F-TPICH, so that an effective position of the TPI is located at a timeslot boundary of the first uplink DPCCH after the end boundary of the TPI combining window, thereby enabling a UE to use a timely TPI and improving demodulation performance of the UE for sending data.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following descriptions show merely some embodiments of the present invention, and a person of ordinary skill in the art may still derive other drawings according to these accompanying drawings without creative efforts.

FIG. 7 is a schematic structural diagram of a terminal according to an embodiment of the present invention; and FIG. 8 is a schematic structural diagram of a network-side device according to an embodiment of the present invention; and FIG. 9 is a flow chart of a transmitted precoding indicator combining method according to an embodiment of the present invention; and FIG. 10 is a flow chart of a transmitted precoding indicator combining method according to an embodiment of the present invention; and FIG. 11 is a schematic structural diagram of a terminal according to an embodiment of the present invention; and FIG. 12 is a schematic structural diagram of a network-side device according to an embodiment of the present invention.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

The technical solutions of the present invention can be applied to various wireless communication networks, such as a wireless local area network (Wireless Local Area Network, WLAN), a global system for mobile communications (Global System for Mobile Communications, GSM) network, a general packet radio service (General Packet Radio Service, GPRS) network, a code division multiple access (Code Division Multiple Access, CDMA) network, a CDMA2000 network, a wideband code division multiple access (Wideband Code Division Multiple Access, WCDMA) network, a long term evolution (Long Term Evolution, LTE) network or a world interoperability for microwave access (World Interoperability for Microwave Access, WiMAX) network, and are applicable to implementation scenarios of a multi-antenna system in the above various communication systems, such as 2×2 uplink (Up Link, UL) multiple input multiple output (Multiple Input Multiple Output, MIMO) and 4×4 UL MIMO.

A network-side device may be a network element, such as a base station (Base Transceiver Station, BTS) in the GSM network, the GPRS network or the CDMA network, or a base station (NodeB) in the CDMA2000 network or the WCDMA network, or an evolved base station (Evolved NodeB, eNB) in the LTE network, or an access service network base station (Access Service Network Base Station, ASN BS) in the WiMAX network.

Figure 1:
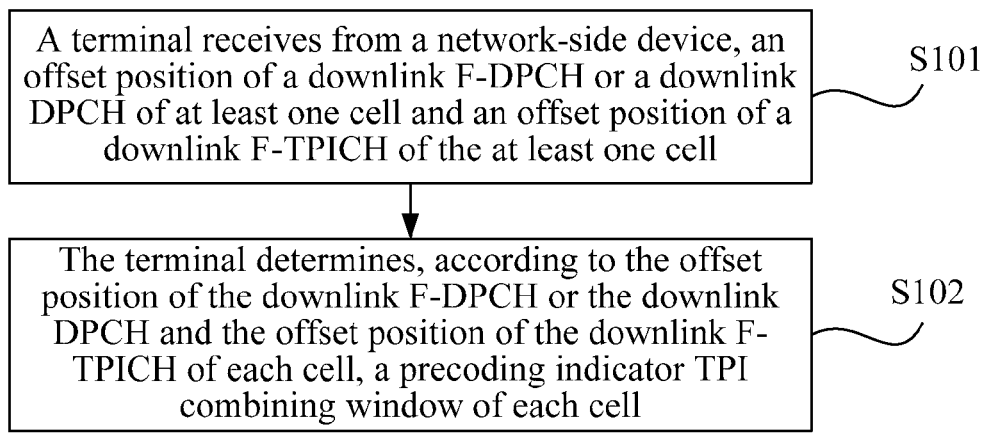
FIG. 1 is a flow chart of a transmitted precoding indicator combining method according to an embodiment of the present invention.

FIG. 1 is a flow chart of a transmitted precoding indicator combining method according to an embodiment of the present invention. As shown in FIG. 1, the method includes:

S101: A terminal receives from a network-side device, an offset position of a downlink fractional dedicated physical channel F-DPCH or a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a start position of a downlink primary common control physical channel P-CCPCH in a time length of two P-CCPCH frames, and the offset position of the downlink F-TPICH is a hysteresis time from a start position of the downlink F-TPICH to the start position of the downlink P-CCPCH in a time length of two P-CCPCH frames.

S102: The terminal determines, according to the offset position of the downlink F-DPCH or the offset position of the downlink DPCH and the offset position of the downlink F-TPICH of each cell, a transmitted precoding indicator TPI combining window of the cell, so that an effective position of a TPI is located at a timeslot boundary of the first uplink dedicated physical control channel DPCCH after an end boundary of the TPI combining window.

The TPI is borne on an F-TPICH channel, and one piece of complete TPI information occupies three timeslots, namely, one subframe. One piece of complete TPI information is composed of two TPI symbols and is borne on first two timeslots of the subframe. The two timeslots adopt a same timeslot format, and each timeslot bears one TPI symbol. A UE applies precoding information indicated by the TPI on the timeslot boundary of the first uplink DPCCH after 512 chips after receiving the second TPI symbol.

There is no determined timing relationship between the uplink DPCCH and the downlink F-TPICH. However, there is a determined timing relationship between the uplink DPCCH and the downlink fractional dedicated physical channel (Fractional Dedicated Physical Channel, F-DPCH) or the downlink dedicated physical channel (Dedicated Physical Channel, DPCH) (in a scenario where the downlink DPCH exists, no downlink F-DPCH exists; and in the scenario where no downlink DPCH exists, the downlink F-DPCH exists). The timing relationship may be a time difference between the start position of the uplink DPCCH and the start position of the downlink F-DPCH or the start position of the downlink DPCH. The start position of the uplink DPCCH is located at 1024 chips after the start position of the downlink F-DPCH or the start position of the downlink DPCH.

Accordingly, based on the determined time relationship between the uplink DPCCH and the downlink F-DPCH or the downlink DPCH, the terminal may determine a position of the TPI combining window according to a timeslot boundary of the downlink F-DPCH or a timeslot boundary the downlink DPCH, so that the effective position of the TPI can be located at the timeslot boundary of the first uplink DPCCH after the end boundary of the TPI combining window, thereby enabling the UE to use a timely TPI and improving demodulation performance of the UE for sending data.

The network side may deliver the offset position of the downlink F-DPCH or the offset position of the downlink DPCH of at least one cell and the offset position of the downlink F-TPICH of the at least one cell to the terminal, so that the terminal can determine the start position of the downlink F-DPCH or the start position of the downlink DPCH according to the offset position of the downlink F-DPCH or the offset position of the downlink DPCH of the at least one cell. Similarly, the terminal may determine the start position of the downlink F-TPICH according to the offset position of the downlink F-TPICH of the cell.

As a feasible implementation manner, the terminal may determine a position with an offset of $(\tau_{F\text{-}DPCH} - \tau_{F\text{-}TPICH} + 512)$ mod 2560 chips from the timeslot boundary of the downlink F-DPCH as a TPI combining window boundary of the cell, where $\tau_{F\text{-}DPCH}$ is the offset position of the downlink F-DPCH, and $\tau_{F\text{-}TPICH}$ is the offset position of the downlink F-TPICH; or the terminal may determine a position with an offset of $(\tau_{DPCH} - \tau_{F\text{-}TPICH} + 512)$ mod 2560 chips from the timeslot boundary of the downlink DPCH as a TPI combining window boundary of the cell, where $\tau_{DPCH}$ is the offset position of the downlink DPCH.

It should be noted that the start positions of the downlink F-TPICH and the downlink F-DPCH/the downlink DPCH are all on the basis of the start position of the downlink P-CCPCH channel.

Figure 2:
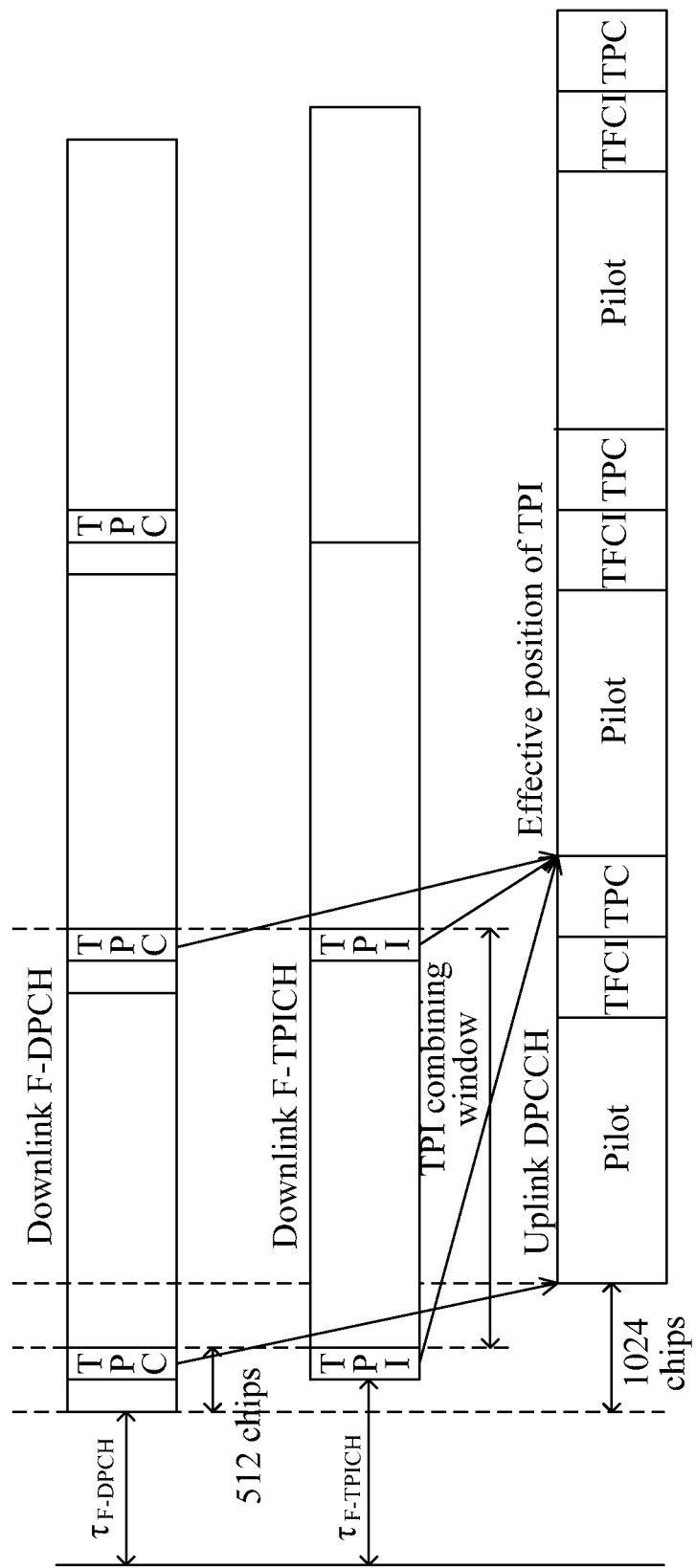
FIG. 2 is a schematic diagram of a terminal determining a transmitted precoding indicator TPI combining window according to a timeslot boundary of an F-DPCH according to an embodiment of the present invention.

It is assumed that the terminal determines the position of the transmitted precoding indicator TPI combining window of a cell according to the offset position of the downlink F-DPCH of the cell. As shown in FIG. 2, the effective position of the TPI can remain at the timeslot boundary of the first uplink DPCCH after the end boundary of the TPI combining window of the cell.

In the terminal provided in this embodiment, the terminal determines, according to an offset position of a downlink F-DPCH or a downlink DPCH and an offset position of a downlink F-TPICH, a transmitted precoding indicator TPI combining window, so that an effective position of a TPI is located at a timeslot boundary of the first uplink DPCCH after an end boundary of the TPI combining window, thereby enabling a UE to use a timely TPI and improving demodulation performance of the UE for sending data.

Figure 3:
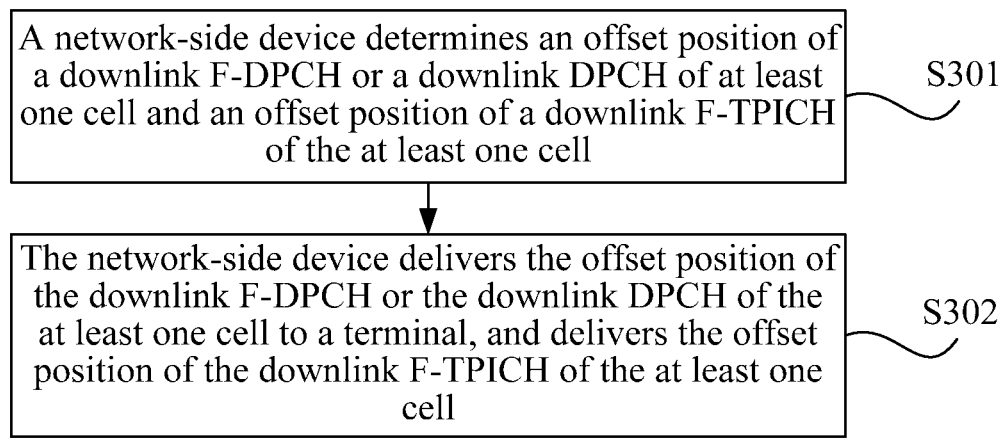
FIG. 3 is a flow chart of a transmitted precoding indicator combining method according to an embodiment of the present invention.

FIG. 3 is a flow chart of a transmitted precoding indicator combining method according to an embodiment of the present invention. As shown in FIG. 3, the method includes:

S301: A network-side device determines an offset position of a downlink fractional dedicated physical channel F-DPCH or a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a start position of a downlink primary common control physical channel P-CCPCH in a time length of two P-CCPCH frames, and the offset position of the downlink F-TPICH is a hysteresis time from a start position of the downlink F-TPICH to the start position of the downlink P-CCPCH in a time length of two P-CCPCH frames.

S302: The network-side device delivers the offset position of the downlink F-DPCH or the offset position of the downlink DPCH of the at least one cell to a terminal, and delivers the offset position of the downlink F-TPICH of the at least one cell, so that the terminal determines a transmitted precoding indicator TPI combining window of each cell according to the offset position of the downlink F-DPCH or the offset position of the downlink DPCH and the offset position of the downlink F-TPICH.

On the basis of the start position of the downlink P-CCPCH channel of any cell, the network-side device may determine the hysteresis time from the start positions of the downlink F-TPICH and the downlink F-DPCH/the downlink DPCH of the cell to the start position of the downlink P-CCPCH channel, that is, determine the offset position of the downlink F-TPICH and the offset position of the downlink F-DPCH/the downlink DPCH.

For the downlink P-CCPCH channel, each frame is 10 ms and has 15 timeslots, and each P-CCPCH frame bears one piece of synchronization frame number (SFN) information. A position with an offset of $\tau$ chips after the start position of the frame of the P-CCPCH whose SFN is an even number is a start position of another channel. Therefore, values of the above offset positions including $\tau_{F\text{-}DPCH}$, $\tau_{F\text{-}TPICH}$ and $\tau_{DPCH}$ may be:

Tp*256 chips, where $T_p \in \{0,1 \ldots 149\}$.

The network-side device may determine the offset position of the downlink F-TPICH and the offset position of the downlink F-DPCH/the downlink DPCH of each cell according to an actual requirement of service transmission of each cell, thereby enabling the terminal to determine a transmitted precoding indicator TPI combining window of a corresponding cell according to the offset position of the downlink F-TPICH and the offset position of the downlink F-DPCH/the downlink DPCH. For the specific process for the terminal to determine the transmitted precoding indicator TPI combining window of the corresponding cell according to the offset position of the downlink F-TPICH and the offset position of the downlink F-DPCH/the downlink DPCH, reference may be made to the embodiments shown in FIG. 1 and FIG. 2, and details are not repeated again herein.

In an implementation scenario where a UE is located at a boundary of at least two cells in a same serving radio link set (Serving RLS), the UE may receive downlink F-TPICHs of the at least two cells from the same serving radio link set. The downlink F-TPICHs have the same TPI, so the UE may combine the TPIs in the TPI combining windows corresponding to different cells.

Optionally, to enable the terminal to combine the TPIs in the TPI combining windows corresponding to different cells, the network-side device may control the start positions of the downlink F-DPCHs or the start position of the downlink DPCHs of at least two cells in the same serving radio link set reaching the terminal to be the same (or basically the same) and the start positions of the F-TPICHs reaching the terminal to be the same (or basically the same), and determine that timing relationships between the offset position of the downlink F-DPCH or the offset position of the downlink DPCH and the offset position of the downlink F-TPICH are the same, so that the TPI combining windows that are determined by the terminal and correspond to the at least two cells coincide (or basically coincide).

As a feasible implementation manner, in an implementation scenario where the TPI of each cell of at least two cells is located between a timeslot boundary of a downlink F-TPICH of the cell and a boundary of the first TPI combining window after the timeslot boundary of the downlink F-TPICH, the network-side device may determine that:

$\tau_{F\text{-}TPICH1} - \tau_{F\text{-}DPCH1} = \tau_{F\text{-}TPICH2} - \tau_{F\text{-}DPCH2} = \ldots = \tau_{F\text{-}TPICHn} - \tau_{F\text{-}DPCHn}$, where $\tau_{F\text{-}TPICHn}$ is an offset position from a start position of an F-TPICH of a cell n to a start position of a primary common control physical channel P-CCPCH of the cell, and $\tau_{F\text{-}DPCHn}$ is an offset position from a start position of an F-DPCH of the cell n to the start position of the P-CCPCH of the cell; or the network-side device may determine that $\tau_{F\text{-}TPICH1} - \tau_{DPCH1} = \tau_{F\text{-}TPICH2} - \tau_{DPCH2} = \ldots = \tau_{F\text{-}TPICHn} - \tau_{DPCHn}$, where $\tau_{DPCHn}$ is an offset position from a start position of a DPCH of a cell n to a start position of a P-CCPCH of the cell.

Figure 4:
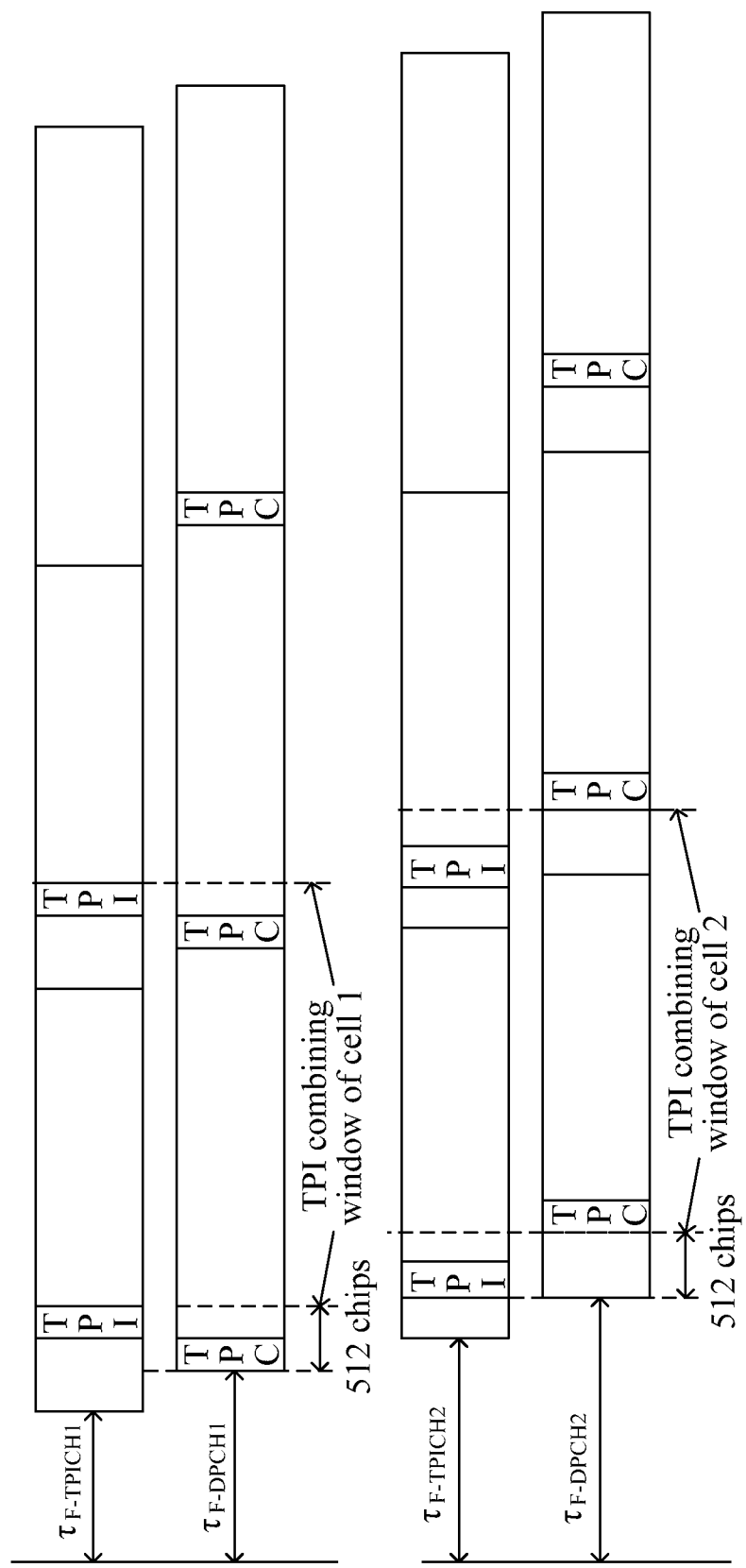
FIG. 4 is a schematic diagram of a network-side device determining a relationship between offset positions of start positions of an F-DPCH and an F-TPICH of at least two cells in a same serving radio link set according to an embodiment of the present invention.

It is assumed that the network-side device determines a timing relationship between the offset positions of the F-DPCH and the F-TPICH of two cells in the same serving radio link set. FIG. 4 shows a timing relationship between offset positions of an F-DPCH and an F-TPICH of a cell 1 and a cell 2 seen by the network-side device. On a UE side, positions of an F-DPCH1 and an F-DPCH2 are the same (or basically the same), and the corresponding TPI combining windows coincide (or basically coincide), thereby enabling the terminal to combine the TPIs in the TPI combining windows corresponding to different cells.

As another feasible implementation manner, in a same timeslot, in an implementation scenario where the TPI of each cell of at least two cells is located between a TPI combining window boundary of the cell and a timeslot boundary of the first downlink F-TPICH after the TPI combining window boundary, the network-side device may determine that:

$\tau_{F\text{-}TPICH1} - \tau_{F\text{-}DPCH1} = \tau_{F\text{-}TPICH2} - \tau_{F\text{-}DPCH2} = \ldots = \tau_{F\text{-}TPICHn} - \tau_{F\text{-}DPCHn}$, where $\tau_{F\text{-}TPICHn}$ is an offset position from a start position of an F-TPICH of a cell n to a start position of a primary common control physical channel P-CCPCH of the cell, and $\tau_{F\text{-}DPCHn}$ is an offset position from a start position of an F-DPCH of the cell n to the start position of the P-CCPCH of the cell; or the network-side device determines that $\tau_{F\text{-}TPICH1} - \tau_{DPCH1} = \tau_{F\text{-}TPICH2} - \tau_{DPCH2} = \ldots = \tau_{F\text{-}TPICHn} - \tau_{DPCHn}$, where $\tau_{DPCHn}$ is an offset position from a start position of a DPCH of a cell n to a start position of a P-CCPCH of the cell.

Figure 5:
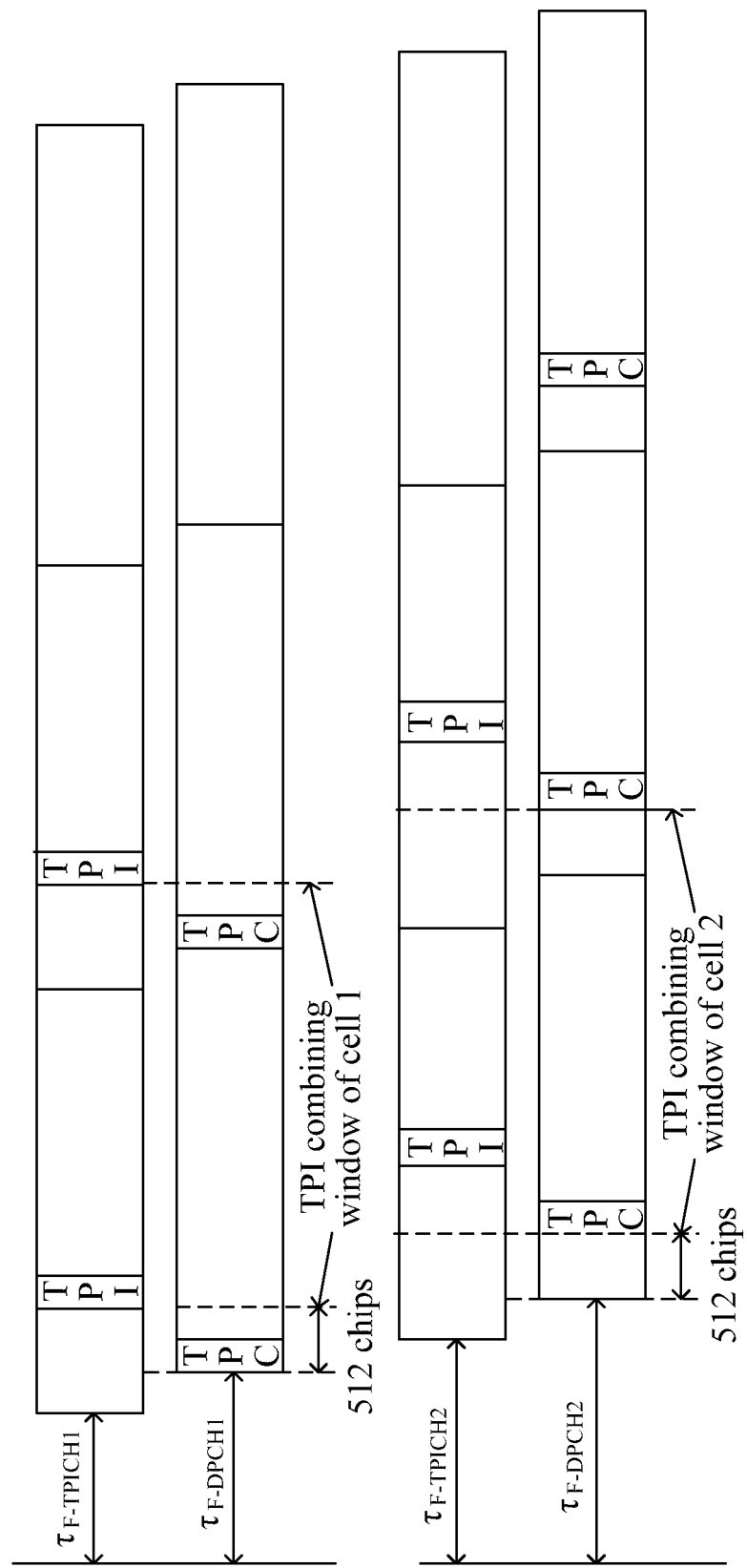
FIG. 5 is a schematic diagram of a network-side device determining a relationship between offset positions of start positions of an F-DPCH and an F-TPICH of at least two cells in a same serving radio link set according to another embodiment of the present invention.

It is assumed that the network-side device determines a timing relationship between the offset positions of the F-DPCH and the F-TPICH of two cells in the same serving radio link set. FIG. 5 shows a timing relationship between offset positions of an F-DPCH and an F-TPICH of a cell 1 and a cell 2 seen by the network-side device. On the UE side, start positions of an F-DPCH1 and an F-DPCH2 are the same (or basically the same), and the corresponding TPI combining windows coincide (or basically coincide), thereby enabling the terminal to combine TPIs in the TPI combining windows corresponding to different cells.

As another feasible implementation manner, in an implementation scenario where the TPI of each cell in a set A of the at least two cells is located between a timeslot boundary of the downlink F-TPICH of the cell and a boundary of the first TPI combining window after the timeslot boundary of the downlink F-TPICH, and the TPI of each cell in a cell set B of the at least two cells is located between a TPI combining window boundary of the cell and a timeslot boundary of the first downlink F-TPICH after the TPI combining window boundary, the network-side device may determine that:

the network-side device determines $\tau_{F\text{-}TPICHA} - \tau_{F\text{-}DPCHA} - 2560 = \tau_{F\text{-}TPICHB} - \tau_{F\text{-}DPCHB}$, where $\tau_{F\text{-}TPICHA}$ is an offset position from a start position of an F-TPICH of a cell in a cell set A to a start position of a P-CCPCH of the cell, $\tau_{F\text{-}DPCHA}$ is an offset position from a start position of an F-DPCH of the cell in the cell set A to the start position of the P-CCPCH of the cell, $\tau_{F\text{-}TPICHB}$ is an offset position from a start position of an F-TPICH of a cell in a cell set B to a start position of a P-CCPCH of the cell, and $\tau_{F\text{-}DPCHB}$ is an offset position from a start position of the F-DPCH of the cell in the cell set B to the start position of the P-CCPCH of the cell; or the network-side device determines that $\tau_{F\text{-}TPICHA} - \tau_{DPCHA} - 2560 = \tau_{F\text{-}TPICHB} - \tau_{DPCHB}$, where $\tau_{DPCHA}$ is an offset position from a start position of a DPCH of a cell in a cell set A to a start position of a P-CCPCH of the cell, and $\tau_{DPCHB}$ is an offset position from a start position of a DPCH of a cell in a cell set B to a start position of a P-CCPCH of the cell.

Figure 6:
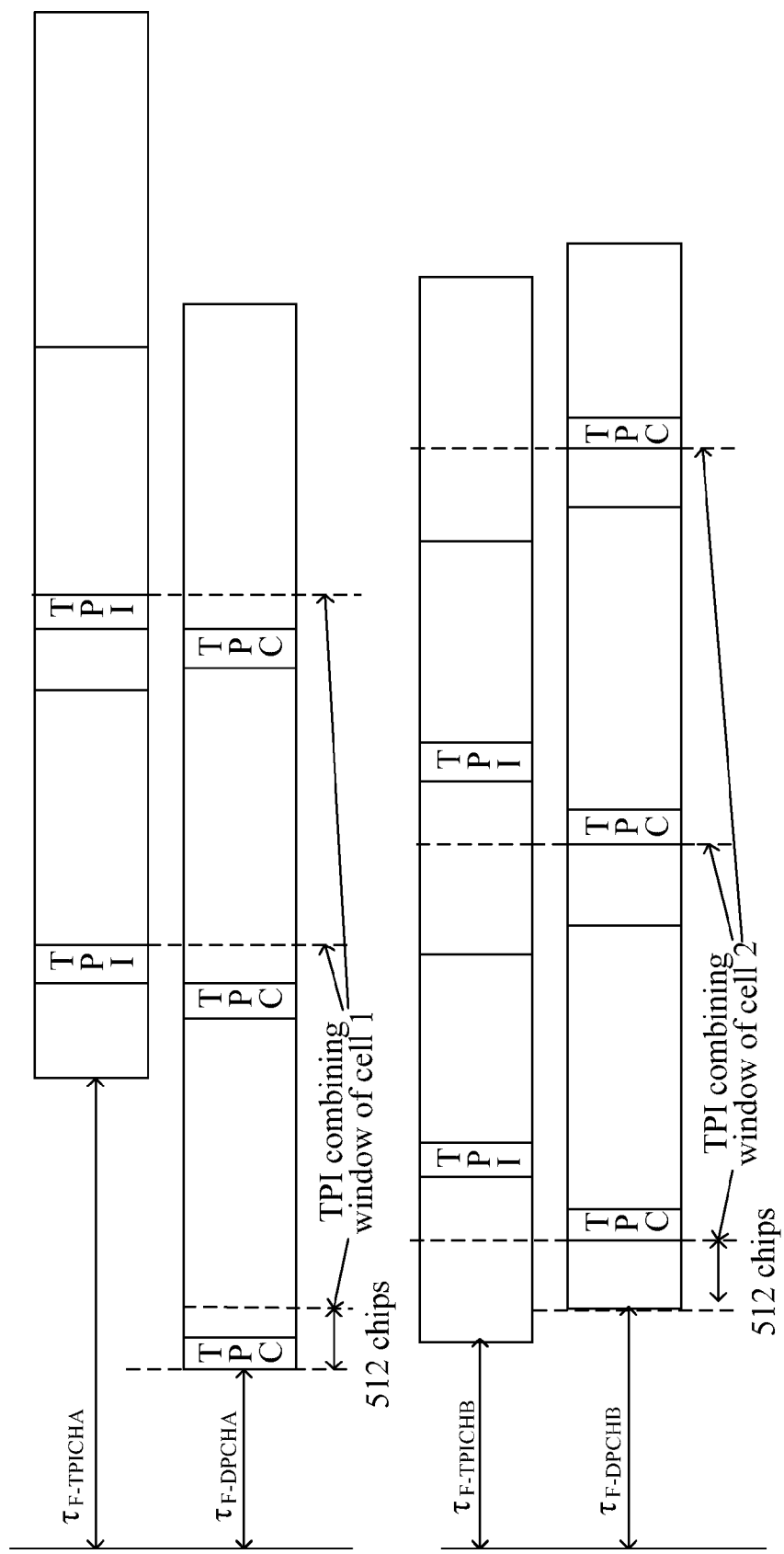
FIG. 6 is a schematic diagram of still another embodiment in which a network-side device determines a relationship between offset positions of start positions of an F-DPCH and an F-TPICH of at least two cells in the same serving radio link set according to the present invention.

It is assumed that the network-side device determines a timing relationship between the offset positions of the F-DPCH and the F-TPICH of two cells in the same serving radio link set. FIG. 6 shows a timing relationship between offset positions of an F-DPCH and an F-TPICH of a cell 1 and a cell 2 seen by the network-side device. On the UE side, start positions of an F-DPCH1 and an F-DPCH2 are the same (or basically the same), and the corresponding TPI combining windows coincide (or basically coincide), thereby enabling the terminal to combine TPIs in the TPI combining windows corresponding to different cells.

In the transmitted precoding indicator combining method provided in this embodiment, a terminal determines a transmitted precoding indicator TPI combining window according to an offset position of a downlink F-DPCH or a downlink DPCH and an offset position of a downlink F-TPICH that are delivered by a network-side device, so that an effective position of a TPI is located at a timeslot boundary of the first uplink DPCCH after an end boundary of the TPI combining window, thereby enabling a UE to use a timely TPI and improving demodulation performance of the UE for sending data. Further, the network-side device may control the start positions of downlink F-DPCHs or the start position of the downlink DPCHs of at least two cells in a same serving radio link set reaching the terminal to be the same (or basically the same) and the start positions of F-TPICHs reaching the terminal to be the same (or basically the same), and determine that timing relationships between the offset position of the downlink F-DPCH or the offset position of the downlink DPCH and the offset position of the downlink F-TPICH are the same, so that the TPI combining windows that are determined by the terminal and correspond to the at least two cells coincide (or basically coincide), thereby enabling the terminal to combine the TPIs in the TPI combining windows corresponding to different cells.

FIG. 7 is a schematic structural diagram of a terminal according to an embodiment of the present invention. As shown in FIG. 7, the terminal includes: a receiver 11 and a processor 12.

The receiver 11 is configured to receive from a network-side device, an offset position of a downlink fractional dedicated physical channel F-DPCH or a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a start position of a downlink primary common control physical channel P-CCPCH in a time length of two P-CCPCH frames, and the offset position of the downlink F-TPICH is a hysteresis time from a start position of the downlink F-TPICH to the start position of the downlink P-CCPCH in a time length of two P-CCPCH frames.

The processor 12 is configured to determine, according to the offset position of the downlink F-DPCH or the offset position of the downlink DPCH and the offset position of the downlink F-TPICH of each cell, a transmitted precoding indicator TPI combining window of the cell, so that an effective position of a TPI is located at a timeslot boundary of the first uplink dedicated physical control channel DPCCH after an end boundary of the TPI combining window.

Optionally, the processor 12 may be specifically configured to:

determine a position with an offset of $(\tau_{F\text{-}DPCH} - \tau_{F\text{-}TPICH} + 512)$ mod 2560 chips from a timeslot boundary of the downlink F-DPCH as a TPI combining window boundary of the cell, where $\tau_{F\text{-}DPCH}$ is the offset position of the downlink F-DPCH, $\tau_{F\text{-}TPICH}$ is the hysteresis time from the start position of the downlink F-TPICH to the start position of the downlink P-CCPCH; or determine a position with an offset of $(\tau_{DPCH} - \tau_{F\text{-}TPICH} + 512)$ mod 2560 chips from a timeslot boundary of the downlink DPCH as a TPI combining window boundary, where $\tau_{DPCH}$ is the offset position of the downlink DPCH.

The terminal provided in the embodiment of the present invention is an executive device of the transmitted precoding indicator combining method provided in the embodiment of the present invention. For the process of executing the transmitted precoding indicator combining method, reference may be made to the embodiments of the transmitted precoding indicator combining method shown in FIG. 1 and FIG. 2 provided in the present invention, and details are not repeated again herein.

In the terminal provided in this embodiment, the terminal determines, according to an offset position of a downlink F-DPCH or a downlink DPCH and an offset position of a downlink F-TPICH, a transmitted precoding indicator TPI combining window, so that an effective position of a TPI is located at a timeslot boundary of the first uplink DPCCH after an end boundary of the TPI combining window, thereby enabling a UE to use a timely TPI and improving demodulation performance of the UE for sending data.

FIG. 8 is a schematic structural diagram of a network-side device according to an embodiment of the present invention. As shown in FIG. 8, the network-side device includes: a processor 21 and a sender 22.

The processor 21 is configured to determine an offset position of a downlink fractional dedicated physical channel F-DPCH or a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a start position of a downlink primary common control physical channel P-CCPCH in a time length of two P-CCPCH frames, and the offset position of the downlink F-TPICH is a hysteresis time from a start position of the downlink F-TPICH to the start position of the downlink P-CCPCH in a time length of two P-CCPCH frames.

The sender 22 is configured to deliver the offset position of the downlink F-DPCH or the offset position of the downlink DPCH of the at least one cell to a terminal, and deliver the offset position of the downlink F-TPICH of the at least one cell, so that the terminal determines a transmitted precoding indicator TPI combining window of each cell according to the offset position of the downlink F-DPCH or the offset position of the downlink DPCH and the offset position of the downlink F-TPICH.

Optionally, the processor 21 may be further configured to: control start positions of downlink F-DPCHs or start positions of downlink DPCHs of at least two cells in a same serving radio link set reaching the terminal to be the same (or basically the same) and start positions of F-TPICHs reaching the terminal to be the same (or basically the same), and determine that timing relationships between the offset position of the downlink F-DPCH or the offset position of the downlink DPCH and the offset position of the downlink F-TPICH are the same, so that the TPI combining windows that are determined by the terminal and correspond to the at least two cells coincide (or basically coincide).

Optionally, if the TPI of each cell of the at least two cells is located between a timeslot boundary of the downlink F-TPICH of the cell and a boundary of the first TPI combining window after the timeslot boundary of the downlink F-TPICH, or the TPI of each cell of the at least two cells is located between a TPI combining window boundary of the cell and a timeslot boundary of the first downlink F-TPICH after the TPI combining window boundary, the processor 21 may be specifically configured to:

determine $\tau_{F\text{-}TPICH1} - \tau_{F\text{-}DPCH1} = \tau_{F\text{-}TPICH2} - \tau_{F\text{-}DPCH2} = \ldots = \tau_{F\text{-}TPICHn} - \tau_{F\text{-}DPCHn}$, where $\tau_{F\text{-}TPICHn}$ is an offset position of a downlink F-TPICH of a cell n, and $\tau_{F\text{-}DPCHn}$ is an offset position of a downlink F-DPCH of the cell n; or determine $\tau_{F\text{-}TPICH1} - \tau_{DPCH1} = \tau_{F\text{-}TPICH2} - $ $\tau_{DPCH2} = \ldots = \tau_{F\text{-}TPICHn} - \tau_{DPCHn}$, where $\tau_{DPCHn}$ is an offset position of a downlink DPCH of a cell n.

Optionally, if the TPI of each cell in a set A of the at least two cells is located between a timeslot boundary of the downlink F-TPICH of the cell and a boundary of the first TPI combining window after the timeslot boundary of the downlink F-TPICH, and the TPI of each cell in a cell set B of the at least two cells is located between a TPI combining window boundary of the cell and a timeslot boundary of the first downlink F-TPICH after the TPI combining window boundary, the processor 21 may be specifically configured to:

determine $\tau_{F\text{-}TPICHA} - \tau\tau_{F\text{-}DPCHA} - 2560 = \tau_{F\text{-}TPICHB} - \tau_{F\text{-}DPCHB}$, where $\tau_{F\text{-}TPICHA}$ is an offset position of a downlink F-TPICH of a cell in the cell set A, $\tau_{F\text{-}DPCHA}$ is an offset position of a downlink F-DPCH of the cell in the cell set A, $\tau_{F\text{-}TPICHB}$ is an offset position of a downlink F-TPICH of a cell in the cell set B, and $\tau_{F\text{-}DPCHB}$ is an offset position of a downlink F-DPCH of the cell in the cell set B; or determine $\tau_{F\text{-}TPICHA} - \tau_{DPCHA} - 2560 = \tau_{F\text{-}TPICHB} - \tau_{DPCHB}$, where $\tau_{DPCHA}$ is an offset position of a downlink DPCH of a cell in the cell set A, and $\tau_{DPCHB}$ is an offset position of a downlink DPCH of a cell in the cell set B.

The network-side device provided in the embodiment of the present invention is an executive device of the transmitted precoding indicator combining method provided in the embodiment of the present invention. For the process of executing the transmitted precoding indicator combining method, reference may be made to the embodiments of the transmitted precoding indicator combining method shown in FIG. 3 to FIG. 6 provided in the present invention, and details are not repeated again herein.

In the network-side device provided by this embodiment, the network-side device determines timing relationships between an offset of a downlink F-DPCH or a downlink DPCH and an offset position of a downlink F-TPICH of at least two cells in a same serving radio link set to be the same, and sends a TPI over the downlink F-TPICH of each cell to a terminal according to the timing relationship between the offset position of the downlink F-DPCH or the offset position of the downlink DPCH and the offset position of the downlink F-TPICH of each cell, so that an effective position of a TPI is located at a timeslot boundary of the first uplink dedicated physical control channel DPCCH after an end boundary of a TPI combining window, thereby enabling a UE to use a timely TPI and improving demodulation performance of the UE for sending data.

FIG. 9 is a flow chart of a transmitted precoding indicator combining method according to an embodiment of the present invention. As shown in FIG. 9, the method includes:

S901: A terminal receives from a network-side device, an offset position of a downlink fractional dedicated physical channel F-DPCH or a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a frame start position of a former downlink primary common control physical channel P-CCPCH in a time length of two P-CCPCH frames, and the offset position of the downlink F-TPICH is a hysteresis time from a start position of the downlink F-TPICH to the frame start position of the former downlink P-CCPCH in a time length of two P-CCPCH frames.

S902: The terminal determines, according to the offset position of the downlink F-DPCH or the offset position of the downlink DPCH and the offset position of the downlink F-TPICH of each cell, a transmitted precoding indicator TPI combining window of the cell, so that an effective position of a TPI is located at a timeslot boundary of the first uplink dedicated physical control channel DPCCH after an end boundary of the TPI combining window.

The TPI is borne on an F-TPICH channel, and one piece of complete TPI information occupies three timeslots, namely, one subframe. One piece of complete TPI information is composed of two TPI symbols and is borne on first two timeslots of the subframe. The two timeslots adopt a same timeslot format, and each timeslot bears one TPI symbol. A UE applies precoding information indicated by the TPI on the timeslot boundary of the first uplink DPCCH after 512 chips after receiving the second TPI symbol.

There is no determined timing relationship between the uplink DPCCH and the downlink F-TPICH. However, there is a determined timing relationship between the uplink DPCCH and the downlink fractional dedicated physical channel (Fractional Dedicated Physical Channel, F-DPCH) or the downlink dedicated physical channel (Dedicated Physical Channel, DPCH) (in a scenario where the downlink DPCH exists, no downlink F-DPCH exists; and in the scenario where no downlink DPCH exists, the downlink F-DPCH exists). The timing relationship may be a time difference between the start position of the uplink DPCCH and the start position of the downlink F-DPCH or the start position of the downlink DPCH. The start position of the uplink DPCCH is located at 1024 chips after the start position of the downlink F-DPCH or the start position of the downlink DPCH.

Accordingly, based on the determined time relationship between the uplink DPCCH and the downlink F-DPCH or the downlink DPCH, the terminal may determine a position of the TPI combining window according to a timeslot boundary of the downlink F-DPCH or a timeslot boundary the downlink DPCH, so that the effective position of the TPI can be located at the timeslot boundary of the first uplink DPCCH after the end boundary of the TPI combining window, thereby enabling the UE to use a timely TPI and improving demodulation performance of the UE for sending data.

The network side may deliver the offset position of the downlink F-DPCH or the offset position of the downlink DPCH of at least one cell and the offset position of the downlink F-TPICH of the at least one cell to the terminal, so that the terminal can determine the start position of the downlink F-DPCH or the start position of the downlink DPCH according to the offset position of the downlink F-DPCH or the offset position of the downlink DPCH of the at least one cell. Similarly, the terminal may determine the start position of the downlink F-TPICH according to the offset position of the downlink F-TPICH of the cell.

As a feasible implementation manner, the terminal may determine a position with an offset of 512 chips from the timeslot boundary of the downlink F-DPCH, or a position with an offset of $(\tau_{F\text{-}DPCH} - \tau_{F\text{-}TPICH} + 512)$ mod 2560 chips from the timeslot boundary of the F-TPICH as a TPI combining window boundary of the cell, where $\tau_{F\text{-}DPCH}$ is the offset position of the downlink F-DPCH, and $\tau_{F\text{-}TPICH}$ is the offset position of the downlink F-TPICH; or the terminal may determine a position with an offset of 512 chips from the timeslot boundary of the downlink DPCH, or $(\tau_{DPCH} - \tau_{F\text{-}TPICH} + 512)$ mod 2560 chips from the timeslot boundary of the F-TPICH as a TPI combining window boundary of the cell, where $\tau_{DPCH}$ is the offset position of the downlink DPCH.

It should be noted that the start positions of the downlink F-TPICH and the downlink F-DPCH/the downlink DPCH are all on the basis of the even numbered frame start position of the downlink P-CCPCH channel in a time length of two neighboring P-CCPCH frames starting from even numbered frame.

Specifically, the offset position of the downlink F-DPCH or the offset position of the downlink DPCH is a hysteresis time from a start position of the downlink F-DPCH or a start position of the downlink DPCH to the frame start position of the even numbered frame of the downlink P-CCPCH in a time length of two neighboring downlink P-CCPCH frames starting from even numbered frame, and the offset position of the downlink F-TPICH is a hysteresis time from a start position of the downlink F-TPICH to the frame start position of the even numbered frame of downlink P-CCPCH in a time length of two neighboring downlink P-CCPCH frames starting from even numbered frame.

It is assumed that the terminal determines the position of the transmitted precoding indicator TPI combining window of a cell according to the offset position of the downlink F-DPCH of the cell. As shown in FIG. 2, the effective position of the TPI can remain at the timeslot boundary of the first uplink DPCCH after the end boundary of the TPI combining window of the cell.

In the terminal provided in this embodiment, the terminal determines, according to an offset position of a downlink F-DPCH or a downlink DPCH and an offset position of a downlink F-TPICH, a transmitted precoding indicator TPI combining window, so that an effective position of a TPI is located at a timeslot boundary of the first uplink DPCCH after an end boundary of the TPI combining window, thereby enabling a UE to use a timely TPI and improving demodulation performance of the UE for sending data.

FIG. 10 is a flow chart of a transmitted precoding indicator combining method according to an embodiment of the present invention. As shown in FIG. 10, the method includes:

S1001: A network-side device determines an offset position of a downlink fractional dedicated physical channel F-DPCH or a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a frame start position of a former downlink P-CCPCH in a time length of two primary common control physical channel P-CCPCH frames, and the offset position of the downlink F-TPICH is a hysteresis time from a start position of the downlink F-TPICH to the frame start position of the former downlink P-CCPCH in a time length of two P-CCPCH frames.

S1002: The network-side device delivers the offset position of the downlink F-DPCH or the offset position of the downlink DPCH of the at least one cell to a terminal, and delivers the offset position of the downlink F-TPICH of the at least one cell, so that the terminal determines a transmitted precoding indicator TPI combining window of each cell according to the offset position of the downlink F-DPCH or the offset position of the downlink DPCH and the offset position of the downlink F-TPICH.

It should be noted that the offset position of the downlink F-DPCH or the offset position of the downlink DPCH is a hysteresis time from a start position of the downlink F-DPCH or a start position of the downlink DPCH to the frame start position of the even numbered frame of the downlink P-CCPCH in a time length of two neighboring downlink P-CCPCH frames starting from even numbered frame, and the offset position of the downlink F-TPICH is a hysteresis time from a start position of the downlink F-TPICH to the frame start position of the even numbered frame of downlink P-CCPCH in a time length of two neighboring downlink P-CCPCH frames starting from even numbered frame.

On the basis of the start position of the downlink P-CCPCH channel of any cell, the network-side device may determine the hysteresis time from the start positions of the downlink F-TPICH and the downlink F-DPCH/the downlink DPCH of the cell to the start position of the downlink P-CCPCH channel, that is, determine the offset position of the downlink F-TPICH and the offset position of the downlink F-DPCH/the downlink DPCH.

For the downlink P-CCPCH channel, each frame is 10 ms and has 15 timeslots, and each P-CCPCH frame bears one piece of synchronization frame number (SFN) information. A position with an offset of τ chips after the start position of the frame of the P-CCPCH whose SFN is an even number is a start position of another channel. Therefore, values of the above offset positions including $\tau_{F-DPCH}$, $\tau_{F-TPICH}$ and $\tau_{DPCH}$ may be:

Tp*256 chips, where $T_p \in \{0,1 \ldots 149\}$.

The network-side device may determine the offset position of the downlink F-TPICH and the offset position of the downlink F-DPCH/the downlink DPCH of each cell according to an actual requirement of service transmission of each cell, thereby enabling the terminal to determine a transmitted precoding indicator TPI combining window of a corresponding cell according to the offset position of the downlink F-TPICH and the offset position of the downlink F-DPCH/the downlink DPCH. For the specific process for the terminal to determine the transmitted precoding indicator TPI combining window of the corresponding cell according to the offset position of the downlink F-TPICH and the offset position of the downlink F-DPCH/the downlink DPCH, reference may be made to the embodiments shown in FIG. 9, and details are not repeated again herein.

In an implementation scenario where a UE is located at a boundary of at least two cells in a same serving radio link set (Serving RLS), the UE may receive downlink F-TPICHs of the at least two cells from the same serving radio link set. The downlink F-TPICHs have the same TPI, so the UE may combine the TPIs in the TPI combining windows corresponding to different cells.

Optionally, to enable the terminal to combine the TPIs in the TPI combining windows corresponding to different cells, the network-side device may control the start positions of the downlink F-DPCHs or the start position of the downlink DPCHs of at least two cells in the same serving radio link set reaching the terminal to be the same (or basically the same) and the start positions of the F-TPICHs reaching the terminal to be the same (or basically the same), and determine that timing relationships between the offset position of the downlink F-DPCH or the offset position of the downlink DPCH and the offset position of the downlink F-TPICH are the same, so that the TPI combining windows that are determined by the terminal and correspond to the at least two cells coincide (or basically coincide).

As a feasible implementation manner, in an implementation scenario where the TPI of each cell of at least two cells is located between a timeslot boundary of a downlink F-TPICH of the cell and a boundary of the first TPI combining window after the timeslot boundary of the downlink F-TPICH, the network-side device may determine that:

$\tau_{F\text{-}TPICH1} - \tau_{F\text{-}DPCH1} = \tau_{F\text{-}TPICH2} - \tau_{F\text{-}DPCH2} = \ldots = \tau_{F\text{-}TPICHn} - \tau_{F\text{-}DPCHn}$, where $\tau_{F\text{-}TPICHn}$ is an offset position from a start position of an F-TPICH of a cell n to a start position of a primary common control physical channel P-CCPCH of the cell, and $\tau_{F\text{-}DPCHn}$ is an offset position from a start position of an F-DPCH of the cell n to the start position of the P-CCPCH of the cell; or the network-side device may determine that $\tau_{F\text{-}TPICH1} - \tau_{DPCH1} = \tau_{F\text{-}TPICH2} - \tau_{DPCH2} = \ldots = \tau_{F\text{-}TPICHn} - \tau_{DPCHn}$, where $\tau_{DPCHn}$ is an offset position from a start position of a DPCH of a cell n to a start position of a P-CCPCH of the cell.

It is assumed that the network-side device determines a timing relationship between the offset positions of the F-DPCH and the F-TPICH of two cells in the same serving radio link set. FIG. 4 shows a timing relationship between offset positions of an F-DPCH and an F-TPICH of a cell 1 and a cell 2 seen by the network-side device. On a UE side, positions of an F-DPCH1 and an F-DPCH2 are the same (or basically the same), and the corresponding TPI combining windows coincide (or basically coincide), thereby enabling the terminal to combine the TPIs in the TPI combining windows corresponding to different cells.

As another feasible implementation manner, in a same timeslot, in an implementation scenario where the TPI of each cell of at least two cells is located between a TPI combining window boundary of the cell and a timeslot boundary of the first downlink F-TPICH after the TPI combining window boundary, the network-side device may determine that:

$\tau_{F\text{-}TPICH1} - \tau_{F\text{-}DPCH1} = \tau_{F\text{-}TPICH2} - \tau_{F\text{-}DPCH2} = \ldots = \tau_{F\text{-}TPICHn} - \tau_{F\text{-}DPCHn}$, where $\tau_{F\text{-}TPICHn}$ is an offset position from a start position of an F-TPICH of a cell n to a start position of a primary common control physical channel P-CCPCH of the cell, and $\tau_{F\text{-}DPCHn}$ is an offset position from a start position of an F-DPCH of the cell n to the start position of the P-CCPCH of the cell; or the network-side device determines that $\tau_{F\text{-}TPICH1} - \tau_{DPCH1} = \tau_{F\text{-}TPICH2} - \tau_{DPCH2} = \ldots = \tau_{F\text{-}TPICHn} - \tau_{DPCHn}$, where $\tau_{DPCHn}$ is an offset position from a start position of a DPCH of a cell n to a start position of a P-CCPCH of the cell.

It is assumed that the network-side device determines a timing relationship between the offset positions of the F-DPCH and the F-TPICH of two cells in the same serving radio link set. FIG. 5 shows a timing relationship between offset positions of an F-DPCH and an F-TPICH of a cell 1 and a cell 2 seen by the network-side device. On the UE side, start positions of an F-DPCH1 and an F-DPCH2 are the same (or basically the same), and the corresponding TPI combining windows coincide (or basically coincide), thereby enabling the terminal to combine TPIs in the TPI combining windows corresponding to different cells.

As another feasible implementation manner, in an implementation scenario where the TPI of each cell in a set A of the at least two cells is located between a timeslot boundary of the downlink F-TPICH of the cell and a boundary of the first TPI combining window after the timeslot boundary of the downlink F-TPICH, and the TPI of each cell in a cell set B of the at least two cells is located between a TPI combining window boundary of the cell and a timeslot boundary of the first downlink F-TPICH after the TPI combining window boundary, the network-side device may determine that:

the network-side device determines $\tau_{F\text{-}TPICHA} - \tau_{F\text{-}DPCHA} - 2560 = \tau_{F\text{-}TPICHB} - \tau_{F\text{-}DPCHB}$, where $\tau_{F\text{-}TPICHA}$ is an offset position from a start position of an F-TPICH of a cell in a cell set A to a start position of a P-CCPCH of the cell, $\tau_{F\text{-}DPCHA}$ is an offset position from a start position of an F-DPCH of the cell in the cell set A to the start position of the P-CCPCH of the cell, $\tau_{F\text{-}TPICHB}$ is an offset position from a start position of an F-TPICH of a cell in a cell set B to a start position of a P-CCPCH of the cell, and $\tau_{F\text{-}DPCHB}$ is an offset position from a start position of the F-DPCH of the cell in the cell set B to the start position of the P-CCPCH of the cell; or the network-side device determines that $\tau_{F\text{-}TPICHA} - \tau_{DPCHA} - 2560 = \tau_{F\text{-}TPICHB} - \tau_{DPCHB}$, where $\tau_{DPCHA}$ is an offset position from a start position of a DPCH of a cell in a cell set A to a start position of a P-CCPCH of the cell, and $\tau_{DPCHB}$ is an offset position from a start position of a DPCH of a cell in a cell set B to a start position of a P-CCPCH of the cell.

It is assumed that the network-side device determines a timing relationship between the offset positions of the F-DPCH and the F-TPICH of two cells in the same serving radio link set. FIG. 6 shows a timing relationship between offset positions of an F-DPCH and an F-TPICH of a cell 1 and a cell 2 seen by the network-side device. On the UE side, start positions of an F-DPCH1 and an F-DPCH2 are the same (or basically the same), and the corresponding TPI combining windows coincide (or basically coincide), thereby enabling the terminal to combine TPIs in the TPI combining windows corresponding to different cells.

In the transmitted precoding indicator combining method provided in this embodiment, a terminal determines a transmitted precoding indicator TPI combining window according to an offset position of a downlink F-DPCH or a downlink DPCH and an offset position of a downlink F-TPICH that are delivered by a network-side device, so that an effective position of a TPI is located at a timeslot boundary of the first uplink DPCCH after an end boundary of the TPI combining window, thereby enabling a UE to use a timely TPI and improving demodulation performance of the UE for sending data. Further, the network-side device may control the start positions of downlink F-DPCHs or the start position of the downlink DPCHs of at least two cells in a same serving radio link set reaching the terminal to be the same (or basically the same) and the start positions of F-TPICHs reaching the terminal to be the same (or basically the same), and determine that timing relationships between the offset position of the downlink F-DPCH or the offset position of the downlink DPCH and the offset position of the downlink F-TPICH are the same, so that the TPI combining windows that are determined by the terminal and correspond to the at least two cells coincide (or basically coincide), thereby enabling the terminal to combine the TPIs in the TPI combining windows corresponding to different cells.

FIG. 11 is a schematic structural diagram of a terminal according to an embodiment of the present invention. As shown in FIG. 11, the terminal includes: a receiver 31 and a processor 32.

The receiver 31 is configured to receive from a network-side device, an offset position of a downlink fractional dedicated physical channel F-DPCH or a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a frame start position of a former P-CCPCH in a time length of two downlink primary common control physical channel P-CCPCH frames, and the offset position of the downlink F-TPICH is a hysteresis time from a start position of the downlink F-TPICH to the frame start position of the former downlink P-CCPCH in a time length of two P-CCPCH frames.

The processor 32 is configured to determine, according to the offset position of the downlink F-DPCH or the offset position of the downlink DPCH and the offset position of the downlink F-TPICH of each cell, a transmitted precoding indicator TPI combining window of the cell, so that an effective position of a TPI is located at a timeslot boundary of the first uplink dedicated physical control channel DPCCH after an end boundary of the TPI combining window.

Optionally, the processor 32 may be specifically configured to:

determine a position with an offset of 512 chips from a timeslot boundary of the downlink F-DPCH, or a position with an offset of $(\tau_{F\text{-}DPCH} - \tau_{F\text{-}TPICH} + 512)$ mod 2560 chips from a timeslot boundary of the downlink F-TPICH as a TPI combining window boundary of the cell, where $\tau_{F\text{-}DPCH}$ is the offset position of the downlink F-DPCH, $\tau_{F\text{-}TPICH}$ is the hysteresis time from the start position of the downlink F-TPICH to the start position of the downlink P-CCPCH; or determine a position with an offset of 512 chips from a timeslot boundary of the downlink DPCH, or a position with an offset of $(\tau_{DPCH} - \tau_{F\text{-}TPICH} + 512)$ mod 2560 chips from a timeslot boundary of the downlink F-TPICH as a TPI combining window boundary, where $\tau_{DPCH}$ is the offset position of the downlink DPCH.

The terminal provided in the embodiment of the present invention is an executive device of the transmitted precoding indicator combining method provided in the embodiment of the present invention. For the process of executing the transmitted precoding indicator combining method, reference may be made to the embodiments of the transmitted precoding indicator combining method shown in FIG. 9 provided in the present invention, and details are not repeated again herein.

In the terminal provided in this embodiment, the terminal determines, according to an offset position of a downlink F-DPCH or a downlink DPCH and an offset position of a downlink F-TPICH, a transmitted precoding indicator TPI combining window, so that an effective position of a TPI is located at a timeslot boundary of the first uplink DPCCH after an end boundary of the TPI combining window, thereby enabling a UE to use a timely TPI and improving demodulation performance of the UE for sending data.

FIG. 12 is a schematic structural diagram of a network-side device according to an embodiment of the present invention. As shown in FIG. 12, the network-side device includes: a processor 41 and a sender 42.

The processor 41 is configured to determine an offset position of a downlink fractional dedicated physical channel F-DPCH or a downlink dedicated physical channel DPCH of at least one cell, and an offset position of a downlink fractional transmitted precoding indicator channel F-TPICH of the at least one cell, where the offset position of the downlink F-DPCH or the offset position of the downlink DPCH is a hysteresis time from a start position of the downlink F-DPCH or a start position of the downlink DPCH to a frame start position of a former downlink P-CCPCH in a time length of two primary common control physical channel P-CCPCH frames, and the offset position of the downlink F-TPICH is a hysteresis time from a start position of the downlink F-TPICH to the frame start position of the former downlink P-CCPCH in a time length of two P-CCPCH frames.

The sender 42 is configured to deliver the offset position of the downlink F-DPCH or the offset position of the downlink DPCH of the at least one cell to a terminal, and deliver the offset position of the downlink F-TPICH of the at least one cell, so that the terminal determines a transmitted precoding indicator TPI combining window of each cell according to the offset position of the downlink F-DPCH or the offset position of the downlink DPCH and the offset position of the downlink F-TPICH.

Optionally, the processor 41 may be further configured to: control start positions of downlink F-DPCHs or start positions of downlink DPCHs of at least two cells in a same serving radio link set reaching the terminal to be the same (or basically the same) and start positions of F-TPICHs reaching the terminal to be the same (or basically the same), and determine that timing relationships between the offset position of the downlink F-DPCH or the offset position of the downlink DPCH and the offset position of the downlink F-TPICH are the same, so that the TPI combining windows that are determined by the terminal and correspond to the at least two cells coincide (or basically coincide).

Optionally, if the TPI of each cell of the at least two cells is located between a timeslot boundary of the downlink F-TPICH of the cell and a boundary of the first TPI combining window after the timeslot boundary of the downlink F-TPICH, or the TPI of each cell of the at least two cells is located between a TPI combining window boundary of the cell and a timeslot boundary of the first downlink F-TPICH after the TPI combining window boundary, the processor 41 may be specifically configured to:

determine $\tau_{F\text{-}TPICH1} - \tau_{F\text{-}DPCH1} = \tau_{F\text{-}TPICH2} - \tau_{F\text{-}DPCH2} = \cdots = \tau_{F\text{-}TPICHn} - \tau_{F\text{-}DPCHn}$, where $\tau_{F\text{-}TPICHn}$ is an offset position of a downlink F-TPICH of a cell n, and $\tau_{F\text{-}DPCHn}$ is an offset position of a downlink F-DPCH of the cell n; or determine $\tau_{F\text{-}TPICH1} - \tau_{DPCH1} = \tau_{F\text{-}TPICH2} - \tau_{DPCH2} = \cdots = \tau_{F\text{-}TPICHn} - \tau_{DPCHn}$, where $\tau_{DPCHn}$ is an offset position of a downlink DPCH of a cell n.

Optionally, if the TPI of each cell in a set A of the at least two cells is located between a timeslot boundary of the downlink F-TPICH of the cell and a boundary of the first TPI combining window after the timeslot boundary of the downlink F-TPICH, and the TPI of each cell in a cell set B of the at least two cells is located between a TPI combining window boundary of the cell and a timeslot boundary of the first downlink F-TPICH after the TPI combining window boundary, the processor 21 may be specifically configured to:

determine $\tau_{F\text{-}TPICHA} - \tau_{F\text{-}DPCHA} - \tau 2560 = \tau_{F\text{-}TPICHB} - \tau_{F\text{-}DPCHB}$, where $\tau_{F\text{-}TPICHA}$ is an offset position of a downlink F-TPICH of a cell in the cell set A, $\tau_{F\text{-}DPCHA}$ is an offset position of a downlink F-DPCH of the cell in the cell set A, $\tau_{F\text{-}TPICHB}$ is an offset position of a downlink F-TPICH of a cell in the cell set B, and $\tau_{F\text{-}DPCHB}$ is an offset position of a downlink F-DPCH of the cell in the cell set B; or determine $\tau_{F\text{-}TPICHA} - \tau_{DPCHA} - 2560 = \tau_{F\text{-}TPICHB} - \tau_{DPCHB}$, where $\tau_{DPCHA}$ is an offset position of a downlink DPCH of a cell in the cell set A, and $\tau_{DPCHB}$ is an offset position of a downlink DPCH of a cell in the cell set B.

The network-side device provided in the embodiment of the present invention is an executive device of the transmitted precoding indicator combining method provided in the embodiment of the present invention. For the process of executing the transmitted precoding indicator combining method, reference may be made to the embodiments of the transmitted precoding indicator combining method shown in FIG. 10 provided in the present invention, and details are not repeated again herein.

In the network-side device provided by this embodiment, the network-side device determines timing relationships between an offset of a downlink F-DPCH or a downlink DPCH and an offset position of a downlink F-TPICH of at least two cells in a same serving radio link set to be the same, and sends a TPI over the downlink F-TPICH of each cell to a terminal according to the timing relationship between the offset position of the downlink F-DPCH or the offset position of the downlink DPCH and the offset position of the downlink F-TPICH of each cell, so that an effective position of a TPI is located at a timeslot boundary of the first uplink dedicated physical control channel DPCCH after an end boundary of a TPI combining window, thereby enabling a UE to use a timely TPI and improving demodulation performance of the UE for sending data.

Persons of ordinary skill in the art may understand that all or part of steps in the foregoing method embodiments may be completed through a program instructing relevant hardware. The foregoing program may be stored in a computer readable storage medium. When the program runs, the steps of the foregoing method embodiment are executed. The foregoing storage medium includes any medium that can store program codes, such as a ROM, a RAM, a magnetic disk or an optical disk.

Finally, it should be noted that the foregoing embodiments are merely provided for describing the technical solutions of the present invention, but not intended to limit the present invention. Although the present invention is described in detail with reference to the foregoing embodiments, persons of ordinary skill in the art should understand that they may still make modifications to the technical solutions described in the embodiments, or equivalent replacements to part of the technical features in the technical solutions; however, these modifications or replacements do not make the essence of corresponding technical solutions depart from the spirit and scope of the present invention.

What is claimed is:

1. A transmitted precoding indicator combining method, comprising:
   receiving, by a terminal from a network-side device, an offset position of a downlink fractional transmitted precoding indicator channel F-TPICH of at least one cell and at least one of:
   an offset position of a downlink fractional dedicated physical channel F-DPCH, and
   a downlink dedicated physical channel DPCH of the at least one cell; and
   determining, by the terminal according to the offset position of the downlink F-TPICH of each of the at least one cells and at least one of the offset position of the downlink F-DPCH or the offset position of the downlink DPCH, a transmitted precoding indicator TPI combining window of the at least one cell so that an effective position of a TPI is located at a timeslot boundary of the first uplink dedicated physical control channel DPCCH after an end boundary of the TPI combining window,
   wherein the offset position of the downlink F-TPICH is a hysteresis time from a start position of the downlink F-TPICH to the frame start position of the former downlink P-CCPCH in a time length of two P-CCPCH frames, and
   wherein the offset position of the downlink F-DPCH or the offset position of the downlink DPCH is a hysteresis time from a start position of the downlink F-DPCH or a start position of the downlink DPCH to a frame start position of a former downlink P-CCPCH in a time length of two primary common control physical channel P-CCPCH frames.

2. The method according to claim 1, wherein determining, by the terminal, a transmitted precoding indicator TPI combining window of the at least one cell comprises at least one of:
   determining, by the terminal, a position with an offset of 512 chips from a timeslot boundary of the downlink F-DPCH, or a position with an offset of $(\tau_{F\text{-}DPCH} - \tau_{F\text{-}TPICH} + 512)$ mod 2560 chips from a timeslot boundary of the F-TPICH as a TPI combining window boundary of the cell, wherein $\tau_{F\text{-}DPCH}$ is the offset position of the downlink F-DPCH, and $\tau_{F\text{-}TPICH}$ is the hysteresis time from the start position of the downlink F-TPICH to the start position of the downlink P-CCPCH, and
   determining, by the terminal, a position with an offset of $(\tau_{DPCH} - \tau_{F\text{-}TPICH} + 512)$ mod 2560 chips from a timeslot boundary of the downlink DPCH as a TPI combining window boundary, wherein $\tau_{DPCH}$ is the offset position of the downlink DPCH.

3. A terminal, comprising:
   a receiver, configured to receive from a network-side device, an offset position of a downlink fractional transmitted precoding indicator channel F-TPICH of at least one cell and at least one of:
   an offset position of a downlink fractional dedicated physical channel F-DPCH, and
   a downlink dedicated physical channel DPCH of the at least one cell; and
   a processor, configured to determine, according to the offset position of the downlink F-TPICH of each of the at least one cells and at least one of the offset position of the downlink F-DPCH or the offset position of the downlink DPCH, a transmitted precoding indicator TPI combining window of the at least one cell so that an effective position of a TPI is located at a timeslot boundary of the first uplink dedicated physical control channel DPCCH after an end boundary of the TPI combining window,
   wherein the offset position of the downlink F-TPICH is a hysteresis time from a start position of the downlink F-TPICH to the frame start position of the former downlink P-CCPCH in a time length of two P-CCPCH frames, and
   wherein the offset position of the downlink F-DPCH or the offset position of the downlink DPCH is a hysteresis time from a start position of the downlink F-DPCH or a start position of the downlink DPCH to a frame start position of a former downlink P-CCPCH in a time length of two primary common control physical channel P-CCPCH frames.

4. The terminal according to claim 3, wherein the processor is configured to perform at least one of:
   determine a position with an offset of 512 chips from a timeslot boundary of the downlink F-DPCH, or a position with an offset of $(\tau_{F\text{-}DPCH} - \tau_{F\text{-}TPICH} + 512)$ mod 2560 chips from a timeslot boundary of the downlink F-TPICH as a TPI combining window boundary of the cell, wherein $\tau_{F\text{-}DPCH}$ is the offset position of the downlink F-DPCH, $\tau_{F\text{-}TPICH}$ is the hysteresis time from the start position of the downlink F-TPICH to the start position of the downlink P-CCPCH; and determine a position with an offset of 512 chips from a timeslot boundary of the downlink DPCH, or a position with an offset of ($\tau_{DPCH}-\tau_{F-TPICH}+512$) mod 2560 chips from a timeslot boundary of the downlink F-TPICH as a TPI combining window boundary, wherein $\tau_{DPCH}$ is the offset position of the downlink DPCH.

5. A network-side device, comprising:
a processor, configured to determine an offset position of a downlink fractional transmitted precoding indicator channel F-TPICH of at least one cell and at least one of:
an offset position of a downlink fractional dedicated physical channel F-DPCH, and
a downlink dedicated physical channel DPCH of at the least one cell; and
a sender, configured to deliver the offset position of the downlink F-DPCH or the offset position of the downlink DPCH of the at least one cell to a terminal, and deliver the offset position of the downlink F-TPICH of the at least one cell, so that the terminal determines a transmitted precoding indicator TPI combining window of each of the at least one cells according to the offset position of the downlink F-DPCH or the offset position of the downlink DPCH and the offset position of the downlink F-TPICH, wherein the offset position of the downlink F-TPICH is a hysteresis time from a start position of the downlink F-TPICH to the frame start position of the former downlink P-CCPCH in a time length of two P-CCPCH frames, and wherein the offset position of the downlink F-DPCH or the offset position of the downlink DPCH is a hysteresis time from a start position of the downlink F-DPCH or a start position of the downlink DPCH to a frame start position of a former downlink P-CCPCH in a time length of two primary common control physical channel P-CCPCH frames.

* * * * *